United States Patent
Meghji et al.

(10) Patent No.: US 9,044,001 B2
(45) Date of Patent: Jun. 2, 2015

(54) APPARATUSES FOR CAPTURING INSECTS AND RELATED METHODS

(75) Inventors: Moez Meghji, Bloomington, IL (US); James White, Bloomington, IL (US); Daniel Casselman, Bloomington, IL (US)

(73) Assignee: SYNGENTA PARTICIPATIONS AG, Basel (CH)

( * ) Notice: Subject to any disclaimer, the term of this patent is extended or adjusted under 35 U.S.C. 154(b) by 923 days.

(21) Appl. No.: 12/392,365

(22) Filed: Feb. 25, 2009

(65) Prior Publication Data

US 2009/0223116 A1 Sep. 10, 2009

Related U.S. Application Data

(60) Provisional application No. 61/068,040, filed on Mar. 4, 2008.

(51) Int. Cl.
*A01M 1/10* (2006.01)
*A01M 1/00* (2006.01)
*A01M 1/02* (2006.01)

(52) U.S. Cl.
CPC ......... *A01M 1/026* (2013.01); *A01M 2200/012* (2013.01)

(58) Field of Classification Search
USPC .......... 43/107, 108, 122, 121, 132.1; 47/20.1, 47/32.4, 32.5, 41.01, 41.1, 41.11, 41.12, 47/41.13, 41.14, 41.15, 42–47; 248/27.8; 119/6.5
See application file for complete search history.

(56) References Cited

U.S. PATENT DOCUMENTS

| 20,091 | A | * | 4/1858 | Riley | 43/107 |
|---|---|---|---|---|---|
| 29,098 | A | * | 7/1860 | Potter, Jr. | 43/108 |
| 40,235 | A | * | 10/1863 | Bolmer | 47/32.4 |
| 53,772 | A | | 4/1866 | Beach | |

(Continued)

FOREIGN PATENT DOCUMENTS

| EP | 1155614 A2 * | 11/2001 | A01M 1/10 |
|---|---|---|---|
| FR | 2691045 A1 * | 11/1993 | A01M 1/10 |

(Continued)

OTHER PUBLICATIONS

Transgenic corn rootworm hybrid stumbles in urbana experiment; some producers also report severe lodging with yieldgard rootworm hybrids in commercial fields, No. 22, Article 1, Sep. 2, 2004, Gray et al., http://bulletin.ipm.illinois.edu/article.php?id=181.

*Primary Examiner* — Darren W Ark
(74) *Attorney, Agent, or Firm* — R. Kody Jones

(57) ABSTRACT

The presently disclosed subject matter provides an apparatus for trapping insects for purposes of monitoring insect load and in some cases studying the captured insects, and methods for using the same. Specifically, the present disclosure relates to an apparatus for trapping insects once they emerge from the soil, such as corn rootworm beetles and related insects, and methods for assembling and using the same. The apparatus comprises a frame having an open bottom and a removable top panel having at least one plant slot configured to receive a plant and a capture chamber opening configured to receive a capture chamber; a flexible sealing structure configured to seal the plant slot on the top panel; and a securing mechanism configured to secure the flexible sealing structure such that a seal is created about the plant to prevent the egress of the insects about the plant.

25 Claims, 11 Drawing Sheets

(56) References Cited

U.S. PATENT DOCUMENTS

| | | | | |
|---|---|---|---|---|
| 57,937 | A * | 9/1866 | Matthews | 43/108 |
| 60,951 | A * | 1/1867 | Smith | 43/108 |
| 126,193 | A * | 4/1872 | Eaton | 47/47 |
| 131,046 | A * | 9/1872 | Bailey | 43/107 |
| 165,776 | A * | 7/1875 | Williams | 43/108 |
| 197,363 | A * | 11/1877 | Headington | 43/107 |
| 265,718 | A | 10/1882 | Thissell | |
| 293,463 | A * | 2/1884 | Hogeboom | 43/108 |
| 316,262 | A * | 4/1885 | Hatmaker | 47/32.4 |
| 598,521 | A * | 2/1898 | Karr | 43/122 |
| 645,880 | A * | 3/1900 | Varnum | 43/107 |
| 668,775 | A * | 2/1901 | Herfert | 43/122 |
| 784,684 | A * | 3/1905 | Karlsen | 43/108 |
| 959,747 | A * | 5/1910 | Humphrey | 43/107 |
| 972,092 | A * | 10/1910 | Berlinger | 43/122 |
| 1,011,170 | A * | 12/1911 | Dennis | 47/32.4 |
| 1,043,431 | A * | 11/1912 | Huffmaster | 43/108 |
| 1,071,437 | A * | 8/1913 | Kramer | 43/122 |
| 1,084,647 | A * | 1/1914 | Libison | 43/122 |
| 1,110,377 | A * | 9/1914 | Cowles | 43/107 |
| 1,125,701 | A * | 1/1915 | Manor | 43/108 |
| 1,219,665 | A * | 3/1917 | Rozwud | 43/122 |
| 1,264,862 | A * | 4/1918 | Roberts | 43/108 |
| 1,287,494 | A * | 12/1918 | Stachura | 43/122 |
| 1,297,894 | A * | 3/1919 | Navrot | 43/122 |
| 1,323,891 | A * | 12/1919 | Marsico | 43/108 |
| 1,378,048 | A * | 5/1921 | Maziarz | 43/122 |
| 1,448,098 | A * | 3/1923 | Varga | 43/122 |
| 1,462,947 | A * | 7/1923 | Stuck | 47/41.11 |
| 1,579,534 | A * | 4/1926 | Hibbard et al. | 43/108 |
| 1,715,958 | A * | 6/1929 | Strand | 43/122 |
| 1,882,380 | A * | 10/1932 | Braun | 43/107 |
| 1,987,394 | A * | 1/1935 | Emerson | 43/108 |
| 1,994,101 | A * | 3/1935 | Hawkins | 43/108 |
| 2,011,405 | A * | 8/1935 | Giliasso | 43/108 |
| 2,030,052 | A * | 2/1936 | Bernitz, Sr. | 43/108 |
| 2,264,973 | A * | 12/1941 | Guarino | 47/41.01 |
| 2,722,081 | A * | 11/1955 | Heffner | 43/121 |
| 3,158,524 | A * | 11/1964 | Tong | 47/41.01 |
| 3,259,236 | A * | 7/1966 | Cole | 47/41.15 |
| 3,272,376 | A * | 9/1966 | Tierney et al. | 119/6.5 |
| 3,315,925 | A * | 4/1967 | Pawl | 47/41.01 |
| 3,571,972 | A * | 3/1971 | Carter, Jr. | 47/32.4 |
| 3,661,350 | A * | 5/1972 | Eckler et al. | 47/41.01 |
| 3,688,432 | A * | 9/1972 | Fruits | 43/61 |
| 3,816,224 | A * | 6/1974 | Smart et al. | 47/41.12 |
| 3,868,787 | A * | 3/1975 | Wong, Jr. | 47/41.13 |
| 4,165,835 | A * | 8/1979 | Dearling | 47/41.01 |
| 4,198,782 | A * | 4/1980 | Kydonieus et al. | 43/124 |
| 4,400,909 | A * | 8/1983 | Reese | 43/108 |
| 4,457,102 | A * | 7/1984 | Ploeger, Jr. | 43/108 |
| 4,642,936 | A | 2/1987 | Jobin et al. | |
| 4,977,701 | A * | 12/1990 | Sherman | 43/122 |
| 5,193,302 | A * | 3/1993 | Rusco et al. | 43/107 |
| 5,381,626 | A * | 1/1995 | Sherfield | 47/32.4 |
| 5,596,833 | A * | 1/1997 | Harrie et al. | 43/122 |
| 5,842,305 | A * | 12/1998 | Liao | 43/122 |
| 5,926,999 | A * | 7/1999 | Vernon et al. | 43/121 |
| 5,987,809 | A * | 11/1999 | Cheok | 43/122 |
| 6,018,905 | A * | 2/2000 | Lingren | 43/107 |
| 6,112,454 | A * | 9/2000 | Plato et al. | 43/122 |
| 6,230,435 | B1 | 5/2001 | Carman | |
| 6,301,827 | B1 * | 10/2001 | Lankster | 43/122 |
| 6,349,500 | B1 * | 2/2002 | Popham | 43/108 |
| 6,393,760 | B1 * | 5/2002 | Lingren | 43/122 |
| 6,430,868 | B1 * | 8/2002 | Plato et al. | 43/122 |
| 6,532,695 | B1 * | 3/2003 | Alvarado | 43/122 |
| 6,722,080 | B2 * | 4/2004 | Carter | 43/107 |
| 6,920,716 | B2 * | 7/2005 | Kollars et al. | 43/107 |
| 6,966,145 | B1 * | 11/2005 | Taft et al. | 43/107 |
| 6,978,572 | B1 * | 12/2005 | Bernklau et al. | 43/107 |
| 6,990,768 | B1 * | 1/2006 | Boston | 43/107 |
| 7,412,797 | B1 * | 8/2008 | Hiscox | 43/122 |
| 7,497,048 | B2 * | 3/2009 | Bakowski | 47/20.1 |
| 7,669,362 | B2 * | 3/2010 | Cwiklinski et al. | 43/122 |
| 7,694,455 | B1 * | 4/2010 | Bowden et al. | 43/107 |
| 8,424,549 | B1 * | 4/2013 | Goldsmith et al. | 47/20.1 |
| 2004/0128903 | A1 * | 7/2004 | Wexler | 43/122 |
| 2005/0279016 | A1 * | 12/2005 | Williams et al. | 43/122 |
| 2006/0096170 | A1 * | 5/2006 | Wright | 47/41.12 |
| 2006/0112624 | A1 * | 6/2006 | Bortman | 47/41.12 |
| 2009/0056210 | A1 * | 3/2009 | Fortner | 47/41.01 |
| 2010/0011659 | A1 * | 1/2010 | Wright | 47/41.01 |
| 2010/0154300 | A1 * | 6/2010 | Wiersma | 47/41.12 |
| 2011/0078950 | A1 * | 4/2011 | Rasmussen | 47/20.1 |
| 2012/0159843 | A1 * | 6/2012 | Whitcomb | 47/20.1 |
| 2014/0053452 | A1 * | 2/2014 | Hall, Jr. | 43/107 |
| 2014/0060217 | A1 * | 3/2014 | Prasifka | 43/107 |
| 2014/0096444 | A1 * | 4/2014 | Castleberry | 47/41.01 |
| 2014/0317994 | A1 * | 10/2014 | Bodo | 43/108 |
| 2014/0317995 | A1 * | 10/2014 | Bodo | 43/108 |

FOREIGN PATENT DOCUMENTS

| | | | | |
|---|---|---|---|---|
| FR | 2717987 A1 * | 10/1995 | | A01M 1/10 |
| JP | 05015286 A * | 1/1993 | | A01M 1/10 |
| JP | 11009119 A * | 1/1999 | | A01M 1/02 |
| JP | 2000189029 A * | 7/2000 | | A01M 1/10 |
| JP | 2001008597 A * | 1/2001 | | A01M 1/10 |
| JP | 2001258456 A * | 9/2001 | | A01M 1/00 |
| JP | 2002125564 A * | 5/2002 | | A01M 1/10 |
| JP | 2003092962 A * | 4/2003 | | A01M 1/00 |
| JP | 2004201600 A * | 7/2004 | | A01M 1/00 |
| JP | 2004305065 A * | 11/2004 | | A01M 1/00 |
| JP | 2005021069 A * | 1/2005 | | A01M 1/10 |
| JP | 2005087199 A * | 4/2005 | | A01M 1/10 |
| JP | 2005143312 A * | 6/2005 | | A01M 1/10 |
| JP | 2006223276 A * | 8/2006 | | A01M 1/10 |
| JP | 2007082439 A * | 4/2007 | | A01M 1/00 |
| JP | 2007267713 A * | 10/2007 | | A01M 1/02 |
| JP | 2008161090 A * | 7/2008 | | A01M 1/10 |
| JP | 2010259352 A * | 11/2010 | | A01M 1/00 |
| WO | WO 9217060 A1 * | 10/1992 | | A01M 1/02 |
| WO | WO 00/24248 | 5/2000 | | |

* cited by examiner

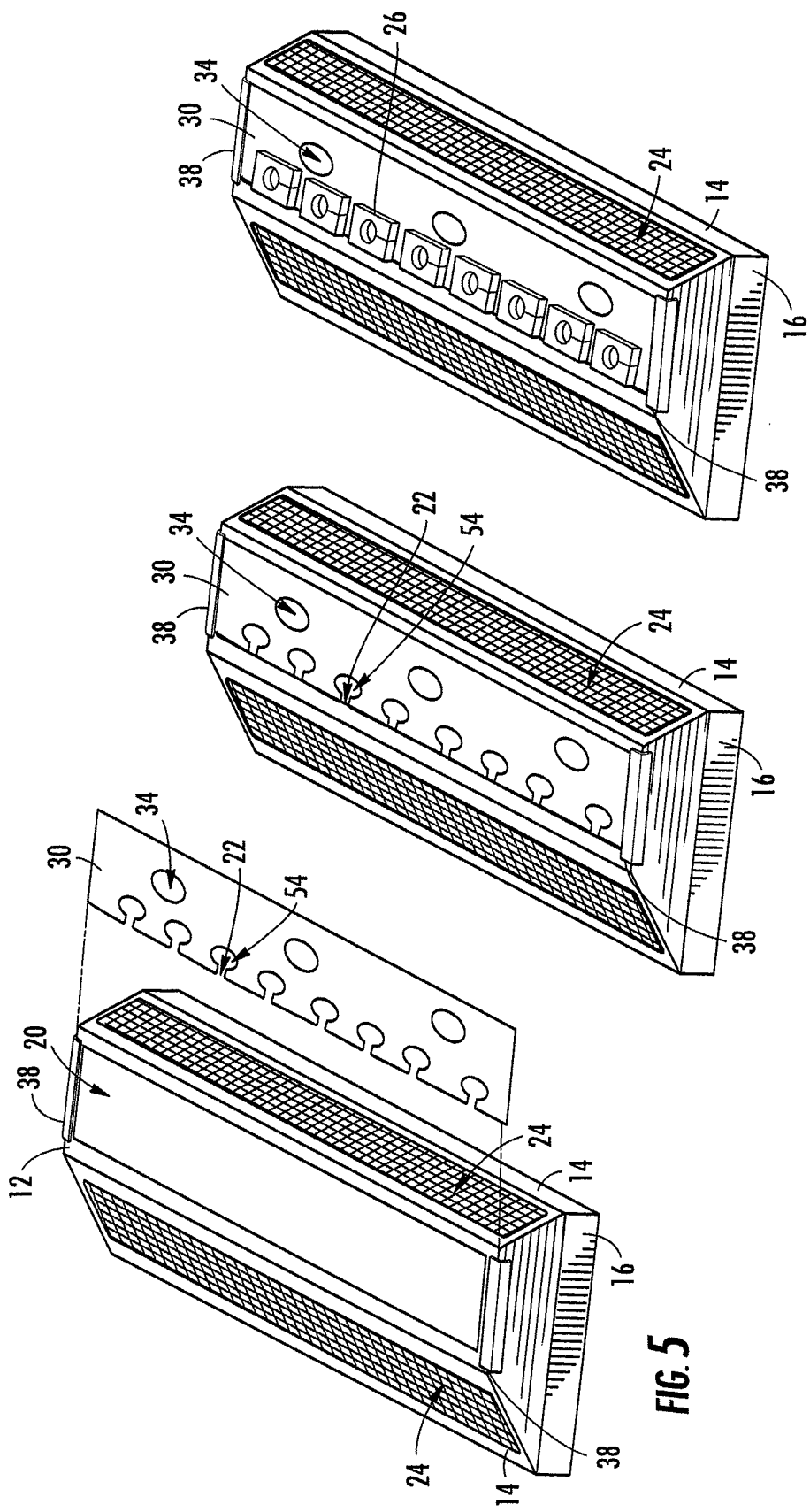

APPARATUSES FOR CAPTURING INSECTS AND RELATED METHODS

RELATED APPLICATIONS

This application claims priority from U.S. Provisional Application No. 61/068,040, filed Mar. 4, 2008.

TECHNICAL FIELD

The presently disclosed subject matter relates to the field of capturing plant insects for purposes of monitoring insect load and in some cases studying the captured insects. Specifically, it relates to an apparatus for trapping insects once they emerge from the soil, as well as methods for making and using the same.

BACKGROUND ART

Plant pests are a major factor in the loss of the world's important agricultural crops. About $8 billion is lost every year in the U.S. due to infestations of plants by non-mammalian pests including insects. Flying insects in general and corn rootworm in particular pose a serious economic problem for corn, peanuts and leafy vegetable crops. Twenty-one million acres of corn are treated annually in many mid-western states with soil-applied preventative insecticides for controlling Western and/or Northern corn rootworm beetle. Thousands of additional acres of corn, peanuts and leafy vegetables are attacked by two other rootworm species, the Southern and Mexican rootworm beetle and also require similar treatments. United States Department of Agriculture (USDA) estimates that only about 30% of these treatments with insecticides are justified from an economic loss point of view. Moreover, for a variety of reasons, only a small portion of these treatments is successful because of the poor administration of the insecticide or because of the resistance the insect has developed toward the insecticide.

Accordingly, another approach to the use of insecticides for controlling plant insect pests is to generate transgenic plants that are resistant to the target insect species. However, monitoring the effects of the transgenic plants on the insect infestation is difficult, as there are currently no available suitable and practical monitoring devices. Methods for trapping, capture and monitoring of the corn rootworm beetle and other similar insects are needed to reduce labor connected with field monitoring, time spent by consultants or pest control advisors on such monitoring, and to predict with high accuracy the insect population and degree of infestation. It is therefore advantageous to have available a convenient and practical insect trap that would permit monitoring of insects such as corn rootworm beetle and related species.

The presently disclosed subject matter provides an insect trap particularly suitable for capture of corn rootworm beetle and other insects that is practical and effective for capturing and monitoring the insects.

SUMMARY

The presently disclosed subject matter pertains to an apparatus for capturing insects, and methods for making and using the same. The apparatus includes a frame having an open bottom and a removable top panel. The top panel can have a plant slot configured to receive a portion of a plant and a capture chamber opening configured to provide a passage to a capture chamber. A flexible sealing structure can be provided that has an opening for receiving a portion of the plant. The flexible sealing structure can be configured to seal the plant slot on the top panel. A securing mechanism can be configured to secure the flexible sealing structure to the top panel such that the opening of the flexible sealing structure aligns with the plant slot of the top panel and the flexible sealing structure creates a seal about the portion of the plant at the plant slot on the top panel to prevent egress of an insect.

In some embodiments, the frame of the apparatus comprises side walls, at least one of the side walls having a window panel therein. In some embodiments, the window panel comprises an air permeable and liquid permeable material. In some embodiments, the air and liquid permeable material comprises a mesh, netting or screen. In some embodiments, at least two of the side walls of the frame are at least partially sloped toward the top panel from the bottom of the frame.

In some embodiments, the plant slot of the apparatus is configured to receive a portion of a plant so that the bottom of the frame along the at least two sloped side walls is an equidistance from the plant placed therein. In some embodiments, the plant slot is configured to receive a stalk, stem or trunk. In some embodiments, the plant slot opens at one side of the top panel.

In some embodiments, the top panel of the apparatus has a plurality of capture chamber openings and a plurality of plant slots. In some embodiments, the plurality of capture chamber openings can be three and the plurality of plant slots can be eight.

In some embodiments, a slit can extend from a periphery of the flexible sealing structure to the opening of the flexible sealing structure. In some embodiments, the flexible sealing structure of the apparatus comprises a first flexible sealing panel and a second flexible sealing panel. Each sealing panel can have an opening for receiving a portion of the plant and a slit extending from a periphery of the respective flexible sealing panel to the opening of the flexible sealing panel. The first and second flexible sealing panels can be configured to be securely positioned between the securing mechanism and the top panel. In some embodiments, the openings of the first and second flexible sealing panels can be aligned with the plant slot of the top panel and the slits of the first and second flexible sealing panels extend in different directions upon alignment. In some embodiments, the slits of the first and second flexible sealing panels do not overlap the plant slot of the top panel. In some embodiments, the slit of the flexible sealing structure comprises at least one of a step cut or a tongue and groove cut.

In some embodiments, the apparatus further comprises a capture chamber configured to capture insects therein and to engage the capture chamber opening. In some embodiments, the capture chamber comprises a funnel affixed inside a container having an open end, the funnel having a narrow end and a wide end with the wide end positioned proximal the open end of the container and the narrow end extending inside the container. In some embodiments, the funnel directs insect egress into the container. In some embodiments, the capture chamber is removable and replaceable from the apparatus. In some embodiments, the top panel of the apparatus further comprises a lip affixed to the top panel and circumscribing the capture chamber opening with the capture chamber being engageable with the top panel by placement of the capture chamber with the open-end of the container facing downward within the lip.

In some embodiments, the securing mechanism of the apparatus comprises at least one of clamps or ties for securing the flexible sealing structure to the top panel. In some embodiments, the securing mechanism comprises a securing panel configured for attachment to the top panel and having a plant receiving slot open to one side. The securing panel can also be configured for holding the flexible sealing structure such that the plant slot of the top panel, the opening of the flexible sealing structure, and the plant receiving slot of the securing panel are coaxially aligned. In some embodiments, the plant receiving slot of the securing panel opens in a different direction from the plant slot of the top panel. In some embodiments, the securing panel comprises two walls and two feet, the feet being configured for insertion in a groove on either side of the plant slot on the top panel such that the securing panel is affixed to the top panel and secures the flexible sealing structure to the top panel.

In some embodiments, a method is provided for assembling an apparatus for capturing insects around a plant. The method can include providing an apparatus that includes a frame having an open bottom and a removable top panel. The top panel can have a plant slot configured to receive a portion of a plant and a capture chamber opening configured to provide a passage to a capture chamber. A flexible sealing structure can be provided that has an opening for receiving a portion of the plant. The flexible sealing structure can be of sufficient size to seal the plant slot on the top panel. A securing mechanism can be configured to secure the flexible sealing structure to the top panel such that the opening of the flexible sealing structure aligns with the plant slot of the top panel and the flexible sealing structure creates a seal about the portion of the plant at the plant slot on the top panel to prevent egress of an insect. The frame can be placed around the plant. The top panel can be slid onto the frame such that the portion of the plant is inserted into the plant slot on the top panel. The flexible sealing structure can be positioned around the plant in the plant slot. The securing mechanism can be positioned such that the securing mechanism secures the flexible sealing structure to the top panel. A capture chamber can engage the top panel at the capture chamber openings such that egress of the insect is blocked at a junction of the top panel and the capture chamber.

In some embodiments, a method is provided for capturing, monitoring and/or studying plant insects. The method can include providing an apparatus that has a frame having an open bottom and a removable top panel. The top panel can have a plant slot configured to receive a portion of a plant and a capture chamber opening configured to provide a passage to a capture chamber. A flexible sealing structure can be configured to have an opening for receiving a portion of the plant. The flexible sealing structure can be of sufficient size to seal the plant slot on the top panel. A securing mechanism can be configured to secure the flexible sealing structure to the top panel such that the opening of the flexible sealing structure aligns with the plant slot of the top panel and the flexible sealing structure creates a seal about the portion of the plant at the plant slot on the top panel to prevent the egress of an insect. The apparatus can be placed around a plant. A capture chamber can engage the top panel at the capture chamber openings such that egress of the insects is blocked at a junction of the top panel and the capture chamber The insects that are captured in the capture chamber can then be obtained. Thereby, the captured insects can be monitored and/or studied.

In some embodiments, the insects to be captured, monitored and/or studied are plant pests that feed on the plant roots and/or a lower portion of the plant. In some embodiments, the plant pests are corn rootworm beetles.

Some of the objects of the subject matter disclosed herein having been stated hereinabove, and which are addressed in whole or in part by the presently disclosed subject matter, other objects will become evident as the description proceeds when taken in connection with the accompanying drawings as best described hereinbelow.

BRIEF DESCRIPTION OF THE DRAWINGS

FIG. 5 illustrates a schematic perspective view of an embodiment of a frame of an insect capturing apparatus with its top panel removed according to the present subject matter;

FIG. 6 shows a schematic perspective view of the frame of FIG. 5 with the top panel positioned thereon;

FIG. 7 shows a schematic perspective view of the frame and top panel of FIGS. 5 and 6 having flexible sealing structures placed over the plant slots in the top panel;

DETAILED DESCRIPTION

Figure 1A:
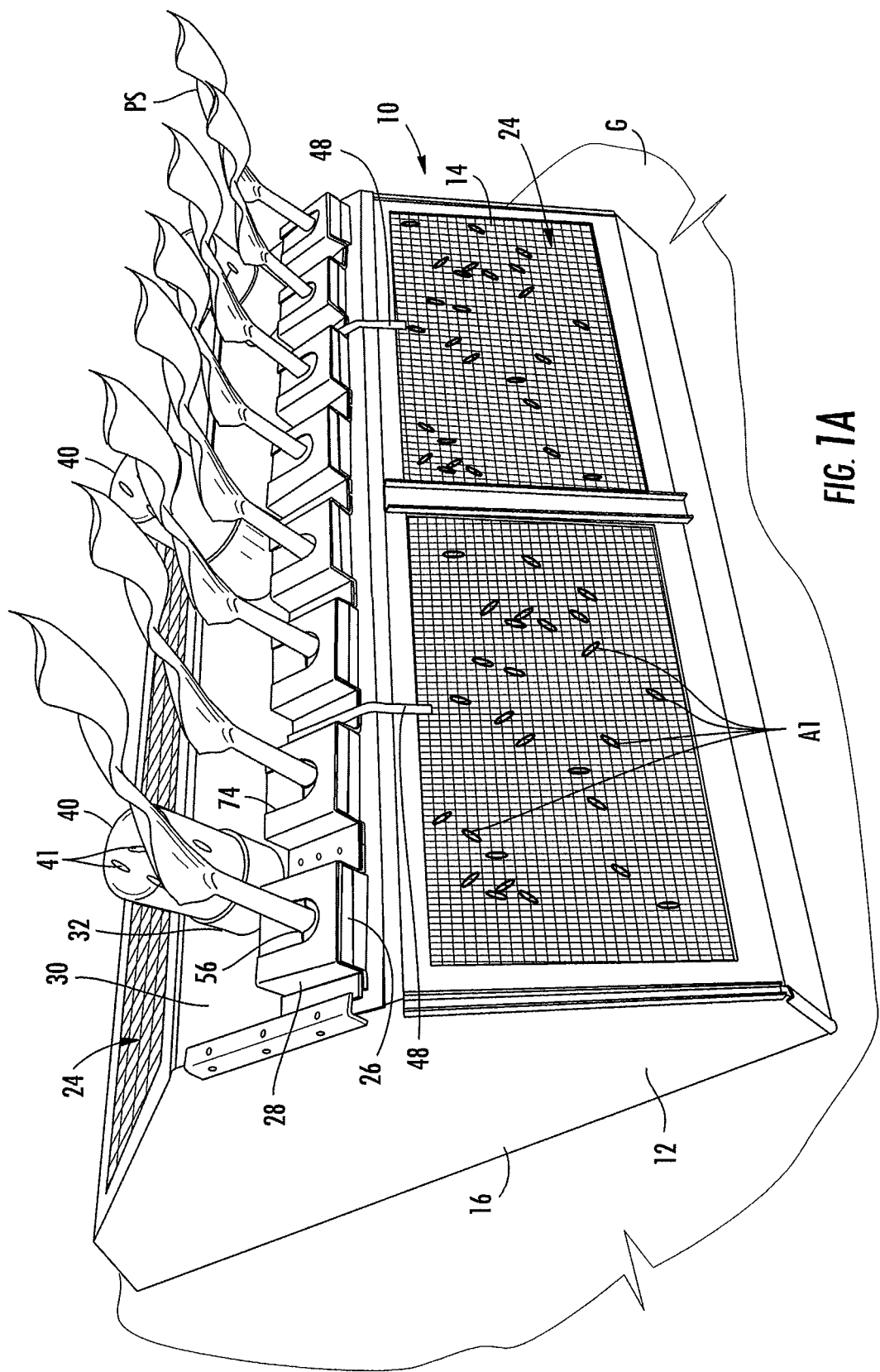
FIG. 1A illustrates a perspective view of an embodiment of an insect capturing apparatus according to the present subject matter.

Reference will now be made in detail to present embodiments of the present subject matter, one or more examples of which are shown in the Figures. Each example is provided to explain the subject matter and not as a limitation. In fact, features illustrated or described as part of one embodiment can be used in another embodiment to yield still yet another embodiment. It is intended that the present subject matter covers such modifications and variations. In the Figures, like reference numerals refer to like parts throughout.

Figure 3:
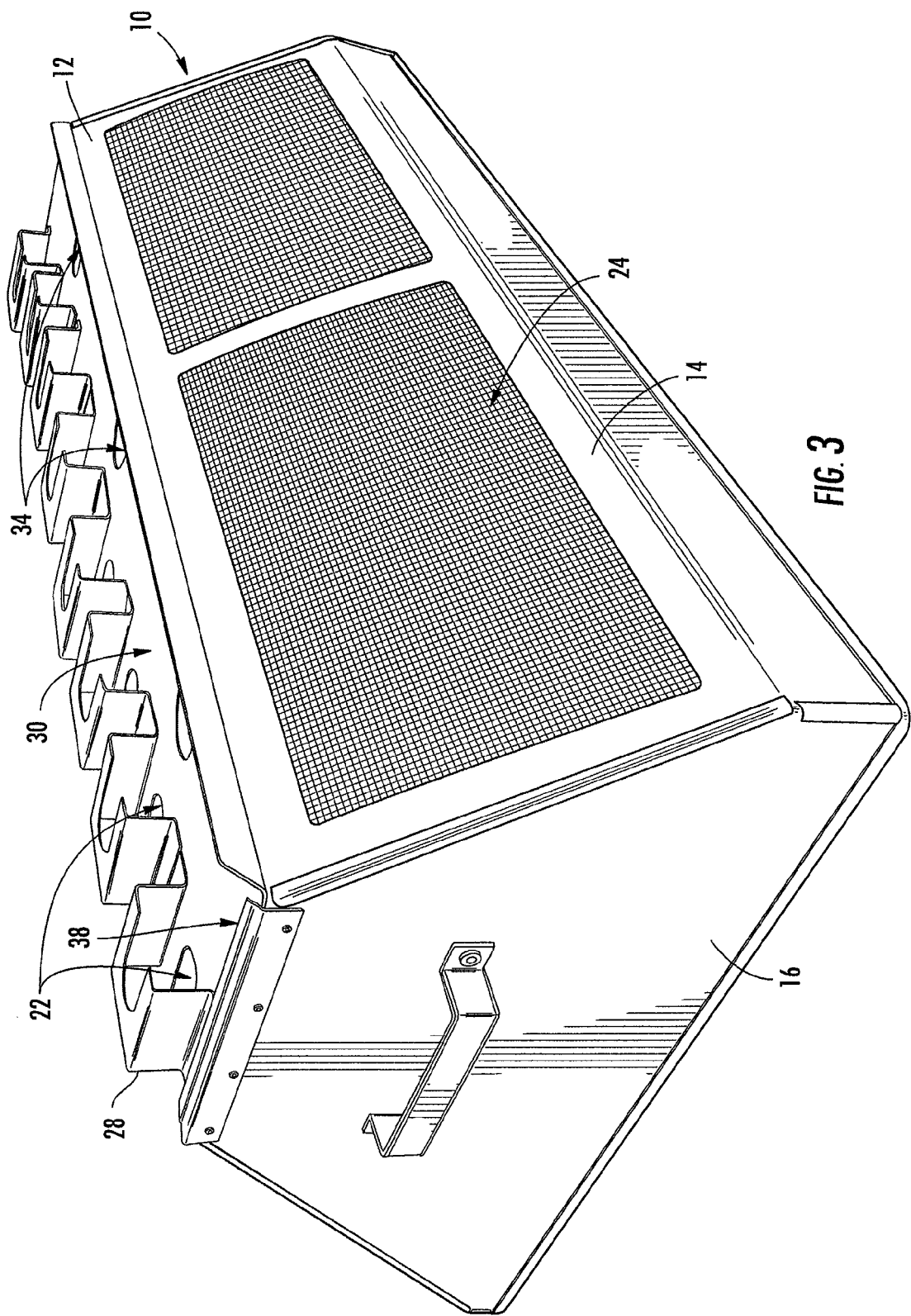
FIG. 3 illustrates a perspective view of apportion of the embodiment of the insect capturing apparatus according to FIGS. 1A and 1B.
Figure 4:
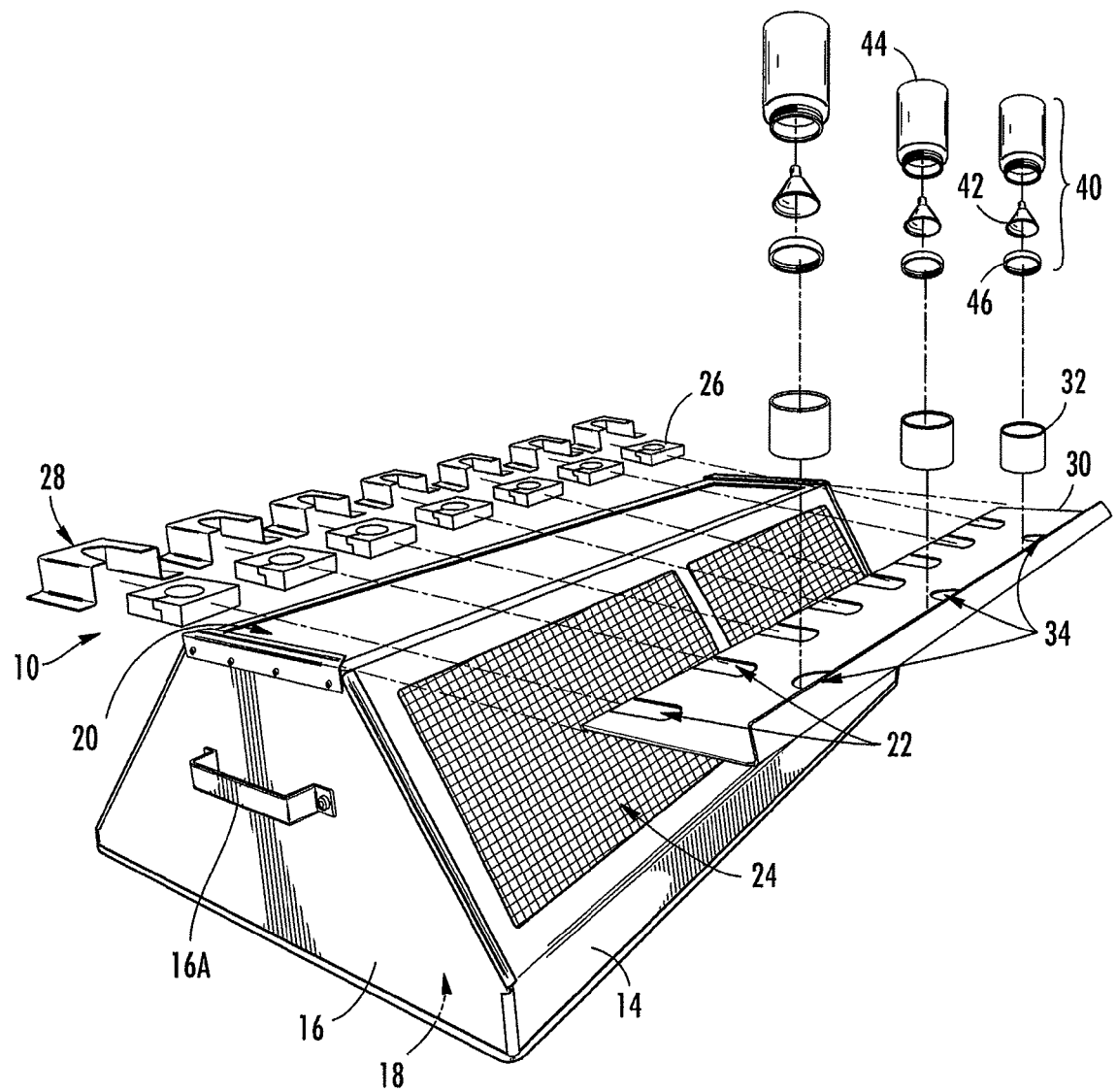
FIG. 4 illustrates an exploded view of the embodiment of the insect capturing apparatus according to FIGS. 1A and 1B.

FIGS. 1A, 1B, 3 and 4 illustrate an embodiment of an insect capturing apparatus, generally designated as 10. Insect capturing apparatus 10 can include a frame 12 having two side walls 14 and two end walls 16 that can form an open bottom 18 and open top 20 (best indicated in FIG. 4). Each side wall 14 can have one or more window panels 24. Frame 12 can include a removable top panel 30 that can be secured over open top 20. Removable top panel 30 includes one or more plant slots 22 (as best seen in FIGS. 3 and 4) into each of which a portion of a plant PS can be inserted as illustrated in FIG. 1A. A flexible sealing structure 26 with an opening 56 therein can be placed overtop each plant slot 22 in top panel 30 around the portion of plant PS to create a seal around that portion of plant PS. A securing mechanism 28 can then be affixed overtop each flexible sealing structure 26 to hold sealing structure 26 in place. Further, each securing mechanism 28 can facilitate the creation a seal about the portion of plant PS through a compression pressure on the respective sealing structure 26. Top panel 30 can also include one or more capture chamber openings 34 for providing a passage into a capture chamber 40 which can be disposed on top panel 30 overtop the respective capture chamber opening 34.

Thus, once frame 12 is placed on the ground G surrounding plants PS, removable top panel 30 can be put into place on frame 12 with a portion on plants PS residing in plant slots 22. In this manner, frame 12 of insect capturing apparatus 10 substantially forms a compartment around the base of one or more plants PS. A flexible sealing structure 26 can be placed around each plant PS with a securing mechanism 28 securing flexible sealing structure 26 to top panel 30. Flexible sealing structure 26 creates a great enough seal to prevent egress of adult insects AI that developed from worms and emerged from the ground underneath frame 12. In this manner, adult insects AI can be trapped within the interior of insect capturing apparatus 10 and be diverted toward capture chamber opening 34 through which they can pass into a capture chamber 40 where insect AI can be collected.

Frame 12 shown in FIGS. 1A, 1B, 3 and 4 can be made from any suitable material. For example, frame 12 can be constructed from metal, wood, plastic, composite materials and the like. For instance, frame 12 can be constructed from galvanized sheeting, plexiglass, hardboard, fiberboard, or the like. Window panels 24 of side walls 14 of insect capturing apparatus 10 can be formed of any suitable material, such as any suitable air and water permeable material. For example, air and water permeable material can include knitted, woven or nonwoven fabrics, mesh, netting, screen material or the like. Further, window panels 24 can be an area of side walls 14 in which a series of holes are formed therein in a pattern. Any air and liquid permeable material like a mesh, netting or screen or a pattern of holes in a side wall should have a pore or hole size and pore or hole density to prevent egress of insects AI to be trapped, while also permitting relatively free flow of air and liquid therethrough. The mesh, netting or screen can be constructed of any suitable material, including, for example, metal wire, plastic, nylon or the like.

The plurality of flexible sealing structures 26 can be made from any suitable flexible and resilient material. For example, flexible sealing structure 26 can be constructed from foam, plastic, rubber, fabric or the like. For instance, flexible sealing structure 26 can be formed from foam that does not significantly absorb water, such as polystyrene foam. Openings 56 in flexible sealing structures 26 can be a central opening that can be aligned coaxially with plant slots 22 of top panel 30.

Securing mechanism 28 can be any size or shape that holds flexible sealing structure 26 in position so that opening 56 of flexible sealing structure 26 aligns with plant slot 22 of top panel 30. Securing mechanism 28 can be one or more panels and can be made from any suitable material. For example, securing mechanism 28 can be constructed from metal, wood, plastic, composite materials and the like. For instance, securing mechanism 28 can be constructed from galvanized sheeting, plexiglass, hardboard, fiberboard, or the like. Securing mechanism 28 can also include straps, clamps, or the like. Securing mechanism 28 can have a plant receiving slot 74 that can be coaxially aligned with opening 56 of flexible sealing structure 26 and plant slot 22 of top panel 30.

The plurality of capture chambers 40 can engage with top panel 30 of frame 12 of insect capturing apparatus 10. Each capture chamber 40 can reside within a lip 32 circumscribing each capture chamber opening 34 in top panel 30 and affixed to top panel 30. Lip 32 can be formed from any suitable material. For example, lip 32 can be constructed from metal, plastic, wood or composite material. In one embodiment, lip 32 can be formed from PVC material.

Figure 1B:
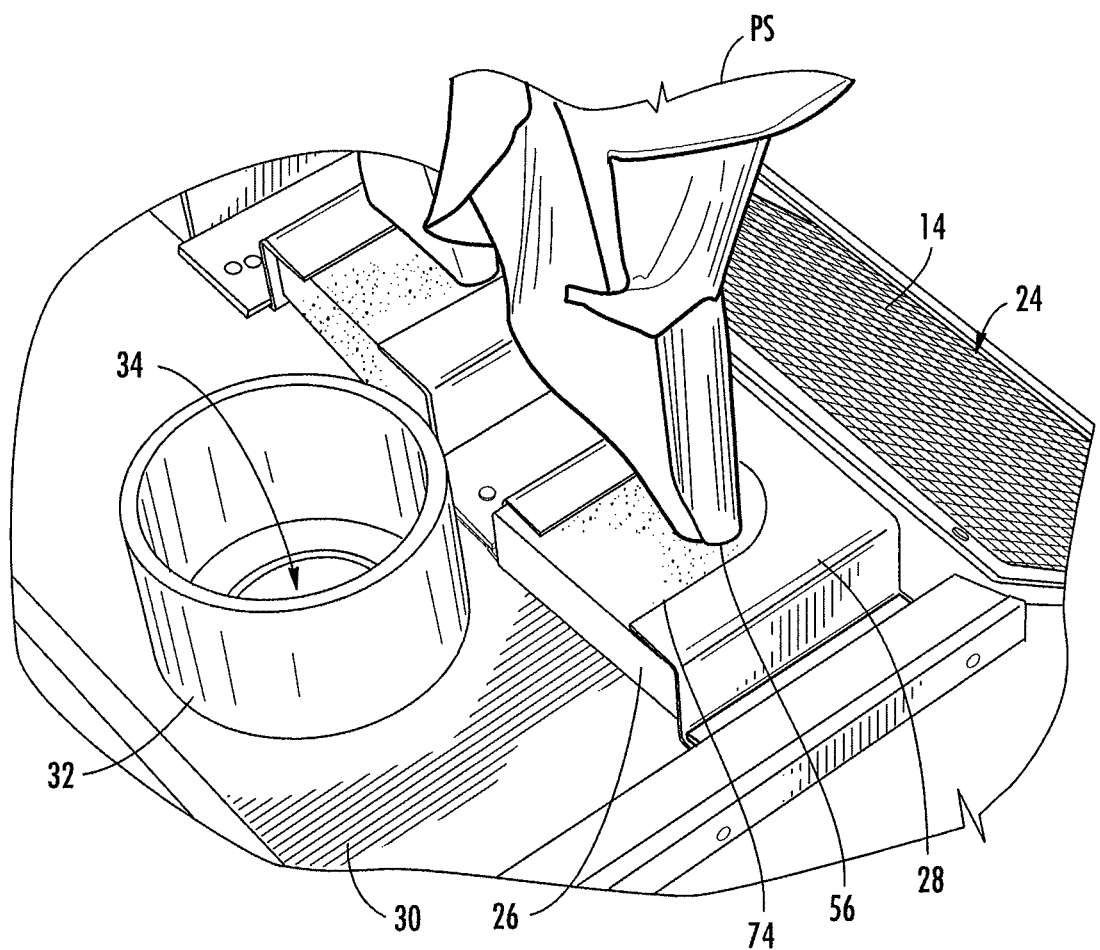
FIG. 1B illustrates a magnified perspective view of a portion of the apparatus according to FIG. 1A.

FIG. 1B illustrates an enlarged top view of insect capturing apparatus 10 shown in FIG. 1A at one end of apparatus 10. FIG. 1B shows flexible sealing structure 26 affixed over the plant slot to top panel 30 by securing mechanism 28, and engaged with plant PS such that a seal is formed around the plant stalk preventing egress of insects AI to be trapped. Capture chamber opening 34 in top panel 30 with lip 32 affixed to top panel 30 is also shown in FIG. 1B. Each lip 32 can be used to provide support for a capture chamber 40 that is placed therein. Each capture chamber 40 is removable and replaceable to permit collection of captured insects. Each capture chamber 40 can be placed within lip 32 so that open-end of capture chamber 40 can be aligned with a capture chamber opening 34 and reside there under its on weight and the support of lip 32. Lip 32 can be of any shape that allows for such support of capture chamber 40.

Figure 2A:
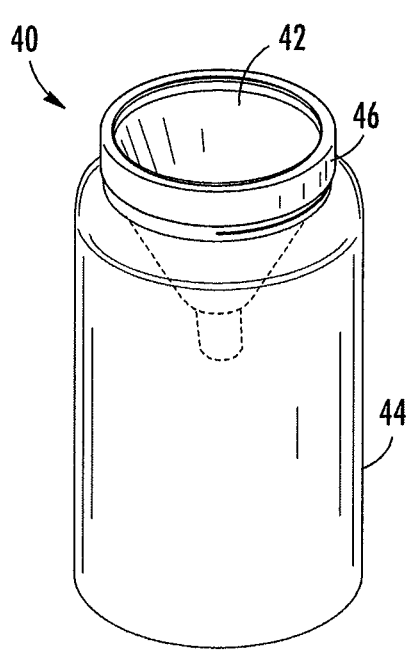
FIG. 2A illustrates a side view of an embodiment of a capture chamber for use with an insect capturing apparatus according to the present subject matter.
Figure 2B:
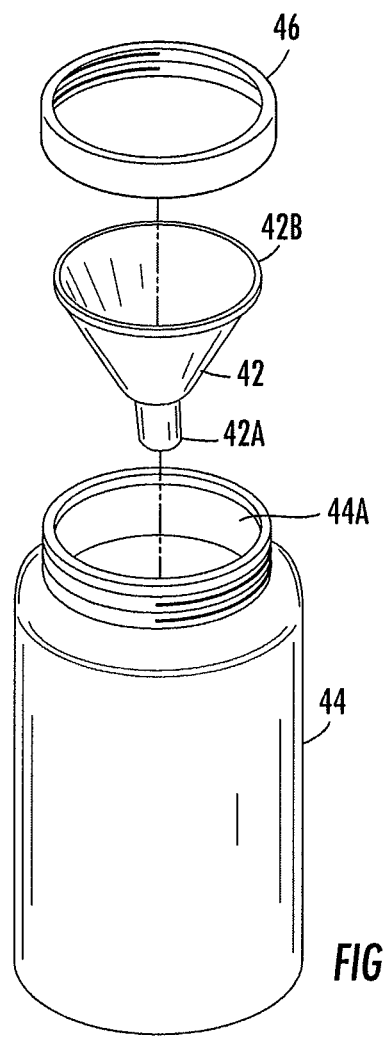
FIG. 2B illustrates an exploded view of the capture chamber according to FIG. 2A.
Figure 2C:
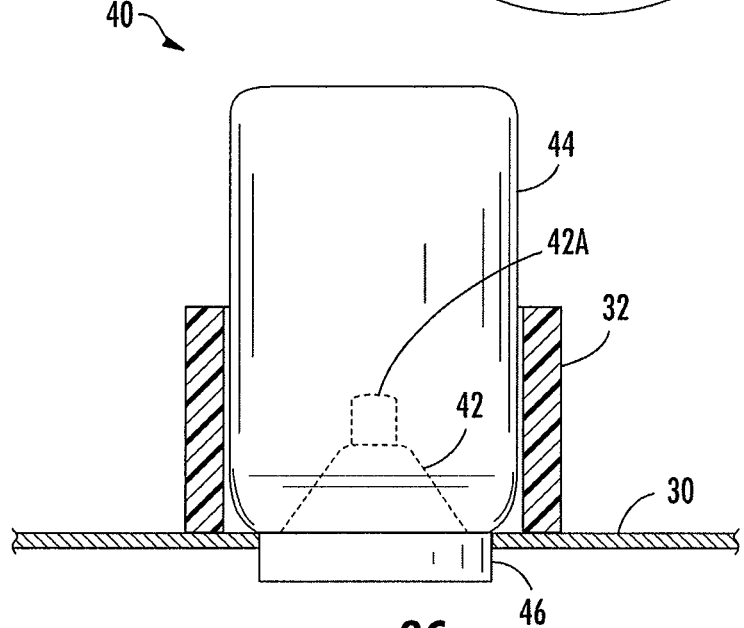
FIG. 2C illustrates a partial cross-sectional view of the capture chamber according to FIG. 2A engaging an insect capturing apparatus according to the present subject matter.

FIGS. 2A-2C further illustrate a capture chamber, generally designated as 40. FIG. 2A illustrates an assembled capture chamber 40, comprising a funnel 42 affixed inside a container 44. FIG. 2B illustrates the same capture chamber 40 dissembled into a container 44, funnel 42 and a sealing lid 46. As best seen in FIG. 2B, and also in FIG. 4, container 44 has an open end 44A, and funnel 42 has a narrow end 42A and a wide end 42B with wide end 42B positioned proximal to open end 44A of container 44 and narrow end 42A extending inside container 44. Container 44 of capture chamber 40 can be made from any suitable material. For example, container 44 can be constructed from glass, plastic, or composite material. Container 40 can be clear to allow for the entrance of light. Alternatively, container 40 can be opaque. Sealing lid 46 can be affixed to container 44 in a manner that funnel 42 is secure in container 44. For example, sealing lid 46 can be snapped or screwed on to container 44. Further sealing lid 46 and funnel 42 can be of an integral single construction. Funnel portion 42 of capture chamber 40 can be made of any suitable material such as plastic, glass, wood, composite material or the like that facilitates egress of insects AI through funnel 42.

As illustrated in schematic side view FIG. 2C and also in FIG. 4, capture chamber 40 can engage with top panel 30 by placement of capture chamber 40 with open-end 44A (see FIG. 2B) of container 44 facing downward within lip 32 affixed to top panel 30. Capture chamber 40 can be received in capture chamber opening 34 as shown in FIG. 2C or can reside on top panel 30 such that capture chamber opening 34 aligns with open-end 44A of container 44. In either embodiment, funnel 42 directs the insect egress into container 44. In this manner, capture chamber 40 is easily removable and replaceable within insect capturing apparatus 10. An attractant can be included in capture chamber 40 to draw the insects into the capture chamber 40. For example, an attractant can be located in container 44.

FIG. 3 illustrates a perspective view of an embodiment of insect capturing apparatus 10 assembled without plants. FIG. 4 illustrates an exploded view of insect capturing apparatus 10. Apparatus 10 includes a frame 12 having an open bottom 18 and a removable top panel 30. Top panel 30 can have one or more plant slots 22 configured to receive a portion of a plant and one or more capture chamber opening 34 configured to receive a capture chamber 40. For example, apparatus 10 can have one, two, four, eight or sixteen plant slots 22. Similarly, apparatus 10 can have one, two, three, four, five, or six or more capture chamber openings 34.

Apparatus 10 shown in FIGS. 3 and 4 further includes flexible sealing structures 26 configured to seal plant slot 22 on top panel 30 around plant and securing mechanisms 28 configured to secure flexible sealing structures 26 to top panel 30. Each flexible sealing structure 26 has a central opening 56 that aligns with plant slot 22 of top panel 30 and flexible sealing structure 26 creates a seal about the portion of plant at plant slot 22 on top panel 30 to prevent the egress of insects to be trapped.

As illustrated in FIGS. 3 and 4 and discussed above, frame 12 of apparatus 10 can include two side walls 14 and two end walls 16. At least one of side walls 14 having a window 24 therein. Further, end walls 16 can also include a window. As described above, these windows can include a structure that prevents egress of insects from apparatus 10 but also permit air and water to flow therethrough. As described above, such a structure can include an air permeable and liquid permeable material. In some embodiments, side walls 14 can have a generally rectangular shape. However, side walls 14 can also have other shapes, for example, square, trapezoidal, or the like. Similarly, end walls 16 can also include different shapes which match with side walls 16 to form a closed compartment once removable top panel 30 is secured thereon. End walls 16 can also include a handle 16A to facilitate transport of apparatus 10.

Side walls 14 can be at least partially sloped from the side of side walls 14 closest to bottom 18 to the side of side walls closest to top 20 of frame 12. For example, the two sides walls 14 of frame 12 extend at an angle greater than 90° as measured from top panel 30 towards the ground as will be explained further below. Thus, the sloped shape of side walls 14 facilitate the passing of rain water through frame 12 and onto the ground on either side of the plant within the compartment formed by frame 12 of insect capturing apparatus 10. Further, the sloped shape of side walls 14 can help to funnel insects toward capture chambers 40 above capture chamber openings 34. The sloped shape of side walls 14 also increase the stability of apparatus 10 by providing a wider base and by diverting the wind.

FIGS. 5,6,7, and 1A are an exemplary illustration of placement of insect capturing apparatus 10 about a series of plants. The plants are not shown in FIGS. 5, 6 and 7 for the sake of clarity. For example, FIG. 5 shows separately frame 12 and top panel 30. Frame 12 can be placed around plants growing in the field. Frame 12 can be placed around the plants such that side walls 14 and end walls 16 reside in and along the ground. Each side wall 14 can touch the ground at a spot equidistant from the stalks of the plant.

As shown in FIG. 6, once the plants have reached the desired stage of growth and prior to the emergence of the insects to be trapped, top panel 30 can be placed on frame 12 such that the stalk, stem or trunk of each of the plants is received within plant slots 22 in top panel 30. Top panel 30 can be slid along the top of frame 12 such that a stalk of plant are engaged within each of plant slots 22 in top panel 30 as shown in FIG. 6 (without the plants). In some embodiments, there is a lip 38 along the top of frame 12 under which top panel 30 can be slid. Lip 38 can help hold top panel 30 in place and prevent top panel 30 from moving off center of frame 12. In some embodiments, top panel 30 is further secured in place to frame 12 by use of a fastener 48 shown in FIG. 1A. For example, fastener 48 can be a hook and loop fastener, such as that available under the registered trademark VELCRO® with one portion of the hook and loop secured to top panel 30 and the other secured to frame 12. Other fasteners can include screws, bolts, snap buttons, bungee cords, ties, tying straps or the like.

FIG. 7 illustrates how flexible sealing structures 26 are placed over plant slots 22 on top panel 30 to allow for a seal to be established around the plant stalk, stem or trunk to prevent egress of the insects to be trapped along the plant stalk, stem or trunk. Once a sealing structure 26 is placed around a plant stalk, stem or trunk a securing mechanism 28 can be affixed to top panel 30, for example, as shown in FIGS. 1A and 1B. Securing mechanism 28 can hold sealing structures 26 in place.

Figure 8A:
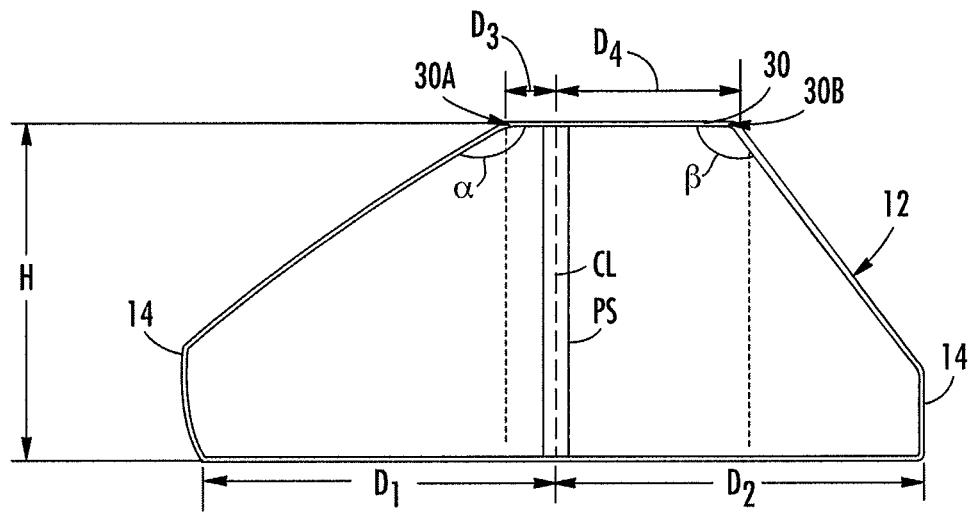
FIG. 8A illustrates a cross-sectional side view of an embodiment of the insect capturing apparatus according to the present subject matter.

FIG. 8A illustrates a cross-sectional view of frame 12 illustrated in FIG. 6. As described above, a center line CL of a given plant stalk can be equidistance from where the two side walls 14 reside against the ground such that distance $D_1$ equals distance $D_2$. In some embodiments, due to the placement of both plant slots 22 and capture chamber openings 34 in top panel 30 (see FIG. 6), plant slots 22 can extend a distance into top panel 30 that is short of its center. Thus, center line CL of a given plant stalk can be a distance $D_3$ from a side 30A of top panel 30 while centerline CL of plant stalk PS is a distance $D_4$ from side 30B of top panel 30. Thereby, since centerline line CL is aligned closer to side 30A of top panel 30, the corresponding side wall 14 extends at an angle $\alpha$ that is greater that an angle $\beta$ at which the side wall 14 extends from side 30B of top panel 30. This design allows for placement of capture chambers 40 over capture chamber openings 34 in top panel 30 while maintaining an equal amount of ground to be covered by apparatus 10 on either side of plant stalks. This feature facilitates accurate monitoring of insect load in the field around the plants. Distances $D_1$, $D_2$ covered on the ground on either side of the row of plant stalks can, for example, be about 15 inches. Distances $D_3$, $D_4$ of plant stalks from side walls 14 of frame 12 at the top edge can, for example, be about 3 inches and about 8 inches, respectively.

Continuing with FIG. 8A, height H of apparatus 10 can also vary depending on the type and variety of plant for which the insects are being monitored. For example, in some embodiments, an apparatus 10 used with corn plants can have a height of about 18 inches.

Figure 8B:
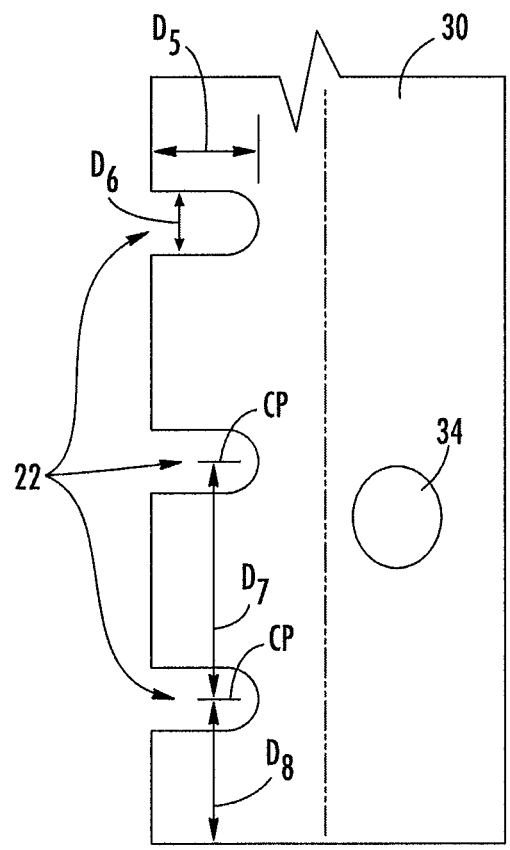
FIG. 8b illustrates a top plan view of an embodiment of a removable top panel of the insect capturing apparatus according to the present subject matter.

The size and placement of plant slots 22 on top panel 30 can be varied depending on the type of plant to be used and the distance between adjacent plants in the field. For example, FIG. 8B shows a portion of a top panel 30. The depth $D_5$ of plant slots 22 and the width $D_6$ can depend upon the types and variations of plants being monitored. For example, in some embodiments, depth $D_5$ can be between about 4 and about 5 inches and width $D_6$ can be about 2 inches. In some embodiments, plant slot 22 can have a narrower channel width and a larger circular region 54 (also seen in FIGS. 5-7) designed to encircle. Similarly, distance $D_7$ between centerlines CP of plant slots 22 can vary depending on the desired spacing between the plants. In some embodiments, distance $D_8$ from the end of top panel 30 to centerline CP can be about half the distance $D_7$ between centerlines CP of plant slots 22. For example, for use with some corn plant varieties planted in rows, distance $D_7$ can be about 6.4 inches. Thus, plant slots 22 in top panel 30 can be about 6.4 inches apart, measured from centerline CP of each plant slot 22. In such cases, the two terminal plant slots 22 are about 3.2 inches from the end of top panel 30, the total length of assembled insect capturing apparatus 10 can be about 4.8 to 5 feet, and the width of apparatus 10 can be about 2.5 feet.

Figure 9A:
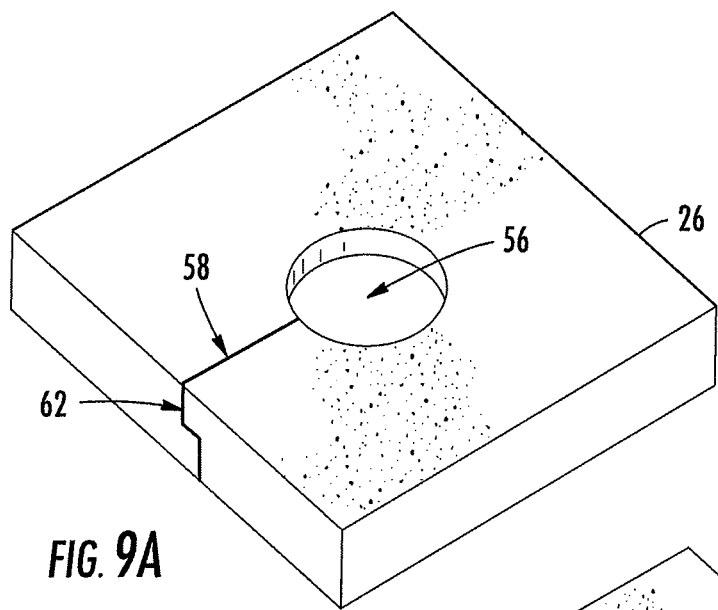
FIGS. 9A-9B illustrate schematic views of different embodiments of flexible sealing structures used in an insect capturing apparatus according to the present subject matter.
Figure 9B:
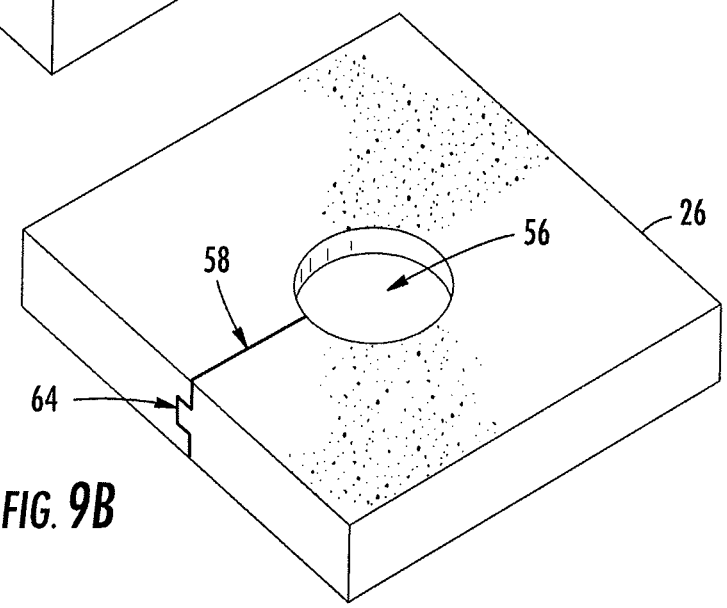
Figure 10:
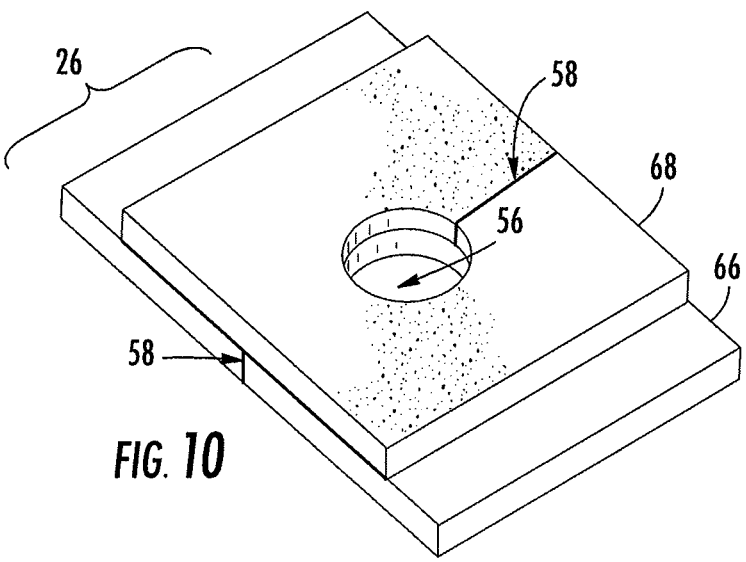
FIG. 10 is a schematic perspective view of a further embodiment of the flexible sealing structure according to the present subject matter.

FIGS. 9A-9B and 10 illustrate different embodiments of a flexible sealing structure 26 of the presently disclosed apparatus 10. FIGS. 9A and 9B illustrate a flexible sealing structure 26 comprising a single panel. In the single panel embodiments illustrated in FIGS. 9A and 9B, flexible sealing structure 26 of apparatus 10 comprises an opening 56 for receiving a portion of a plant and a slit 58 extending from a periphery of flexible sealing structure 26 to opening 56 of flexible sealing structure 26. Opening 56 can be centrally located within the flexible sealing structure 26. Opening 56 of flexible sealing structure 26 can be aligned with plant slot 22 of top panel 30. Accordingly, flexible sealing structure 26 can be of any size and shape suitable to cover plant slot 22 of top panel 30. As described herein above, flexible sealing structure 26 can be made from any suitable flexible material including foam, plastic, rubber, fabric or the like. In one embodiment, the flexible material is polystyrene foam.

In other embodiments of flexible sealing structure 26, flexible sealing structure 26 can be, for example, a flexible woven, non-woven or knitted fabric or cloth. Flexible sealing structure 26 can be wrapped around a plant stalk, stem or trunk PS (shown in FIGS. 1A-1B) above plant slot 22 of top panel 30. A securing mechanism 28 can hold such a flexible sealing structure 26 in place around the plant stalk, stem or trunk PS. In this manner, flexible sealing structure 26 covers plant slot 22 of top panel 30 and creates a seal that prevents an egress for insects along plant stalk, stem or trunk PS.

As shown in FIG. 9A, slit 58 of flexible sealing structure 26 can have a step pattern 62 along its side. In a further embodiment as shown in FIG. 9B, slit 58 of flexible sealing structure 26 can have a tongue and groove pattern 64. Such embodiments permit sealing structure 26 to expand and contract without creating an egress for insects to pass through along slit 58. Upon placement of sealing structure 26 around a portion of a plant, slit 58 of flexible sealing structure 26 does not need to overlap plant slot 22 of top panel 30, but can instead extend in a different direction.

In the embodiment shown in FIG. 10, flexible sealing structure 26 of apparatus 10 comprises a first flexible sealing panel 66 and a second flexible sealing panel 68. As described above, first 66 and second 68 flexible sealing panels can be made of any suitable flexible material, and each of first 66 and second 68 flexible sealing panels can have an opening 56 for receiving a portion of plant and a slit 58 extending from a periphery of the respective flexible sealing panel to the opening of the flexible sealing panel. The openings 56 can be centrally located. First 66 and second 68 flexible sealing panels are placed one on top of each other, and openings 56 of the respective flexible sealing panels are aligned with plant slot 22 of top panel 30. Accordingly, first 66 and second 68 flexible sealing panels can be of any size and shape suitable to cover plant slot 22 of top panel 30. In some embodiments, first 66 and second 68 flexible sealing panels can be of equal size, and in some embodiments, first flexible sealing panel 66 can be larger than second flexible sealing panel 68.

Slit 58 of first 66 and second 68 flexible sealing panels can be a linear pattern as shown in FIG. 10. Alternatively, slit 58 of first 66 and second 68 flexible sealing panels can be a step pattern 62 or a tongue and groove pattern 64 as shown in FIGS. 9A and 9B, respectively. As described above, in some embodiments, the portion of plant PS to be received by opening 56 in first 66 and second 68 flexible sealing panels is a stalk, stem or trunk. Upon placement of first 66 and second 68 flexible sealing panels around a portion of a plant, slits 58 of first 66 and second 68 flexible sealing panels do not need to overlap plant slot 22 of top panel 30 or each other. As illustrated in FIG. 10, slits 58 of first 66 and second 68 flexible sealing panels can extend in different directions upon alignment.

In some embodiments, the portion of plant to be received by the respective opening 56 in flexible sealing structure 26 is a stalk, stem or trunk. The size of opening 56 can depend on the type and variety of plant. For example, plant can be a corn plant. In some embodiments, plant for which insects are being monitored can be a hybrid corn plant and the diameter of opening 56 in flexible sealing structure 26 can be about 1 inch. In some embodiments, plant is an inbred corn plant and the diameter of opening 56 in flexible sealing structure 26 can be about ¾ inch.

Figure 11A:
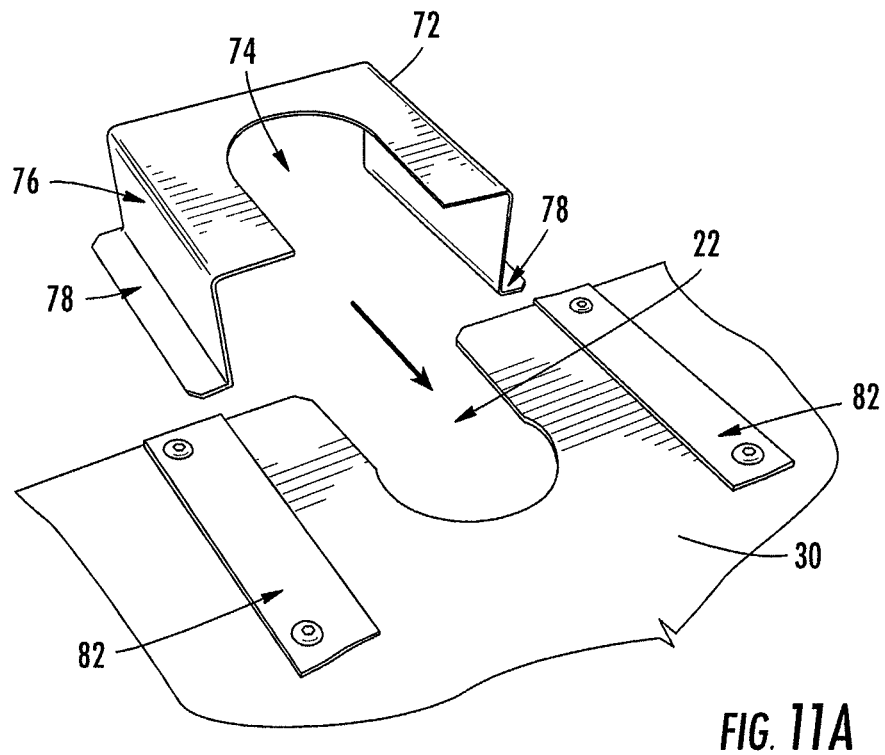
FIGS. 11A-11E illustrate perspective views of different embodiments of the securing mechanism of an insect capturing apparatus according to the present subject matter.

FIGS. 11A-11E illustrate different embodiments of securing mechanism 28 of insect capturing apparatus 10. Securing mechanism 28 can configured to secure flexible sealing structure 26 (not shown in FIG. 11A) to top panel 30 such that a seal is formed between flexible sealing structure 26 and the plant stalk, stem or trunk PS (not shown in FIGS. 11A-11E). FIG. 11A illustrates an embodiment of securing mechanism 28 having a securing panel 72 comprising a plant receiving slot 74 opening from one side, two walls 76 and two feet 78, the feet 78 being configured for insertion under a lip 82 on either side of plant slot 22 on top panel 30.

Figure 11B:
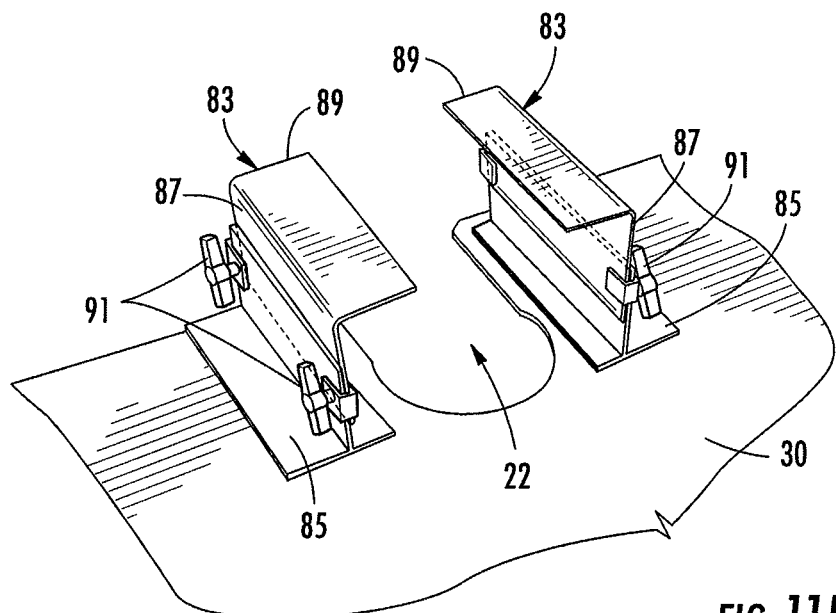

FIG. 11B illustrates an alternative embodiment of securing mechanism 28 comprising two clamps 83 configured to secure flexible sealing structure 26 (not shown in FIG. 11B) to top panel 30 such that a seal is formed between flexible sealing structure 26 and the plant stalk, stem or trunk. Each clamp 83 includes a stationary portion 85 that can be affixed or be integral to top panel 30 and a moveable portion 87 that can be moved, for example, up and down. Each clamp 83 can also have a panel 89 that extends out from movable portion 87 over at least a portion of plant slot 22. At least one locking knob 91 can secure each movable portion 87 to stationary portion 85. Knobs 91 can be loosened and movable portion 87 can be raised during placement of a sealing structure 26 around a plant extending through plant slot 22. After placement of sealing structure 26, movable portion 87 can be lowered to a position that holds sealing structure 26 in place and helps to create the seal around plant. Knobs 91 can then be tightened. Securing clamps 83 can similarly be constructed of any suitable material including metal, plastic, composite material and the like.

Figure 11C:
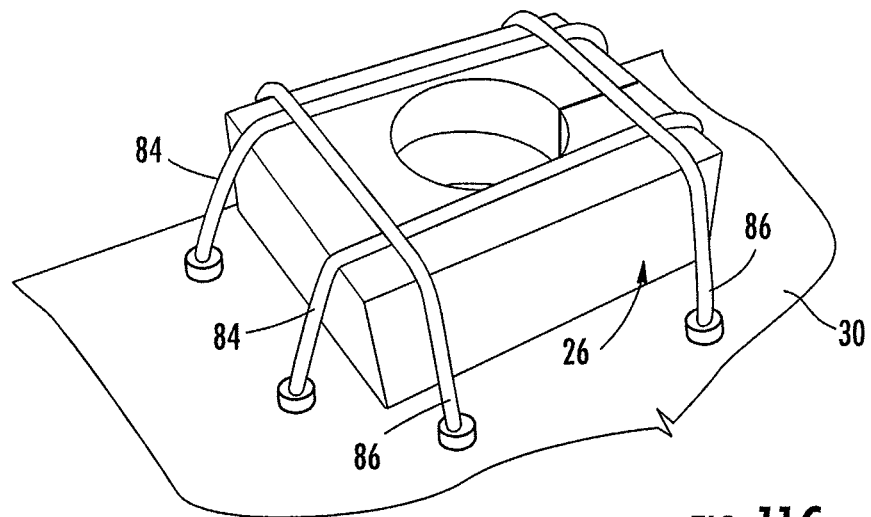

FIG. 11C illustrates an alternative embodiment of securing mechanism 28 comprising two ties 84 that extend generally in a first direction and two ties 86 that extend generally in a second direction that is about perpendicular to the first direction. This criss-cross pattern of ties 84, 86 spaced apart to apply pressure on four sides surrounding opening 56 is configured to secure flexible sealing structure 26 to top panel 30 such that a seal is formed between flexible sealing structure 26 and the plant stalk, stem or trunk. Securing ties 84, 86 can be constructed of any suitable material including metal, plastic, composite material or the like, as well as any suitable fibrous material including flexible and/or elastic fibrous material. For instance, securing ties 84, 86 can be a bungee cord, rope, string, metal cord or the like. In some embodiments, one, two, three, four or more securing ties in just one direction can be configured to achieve the necessary seals.

Figure 11D:
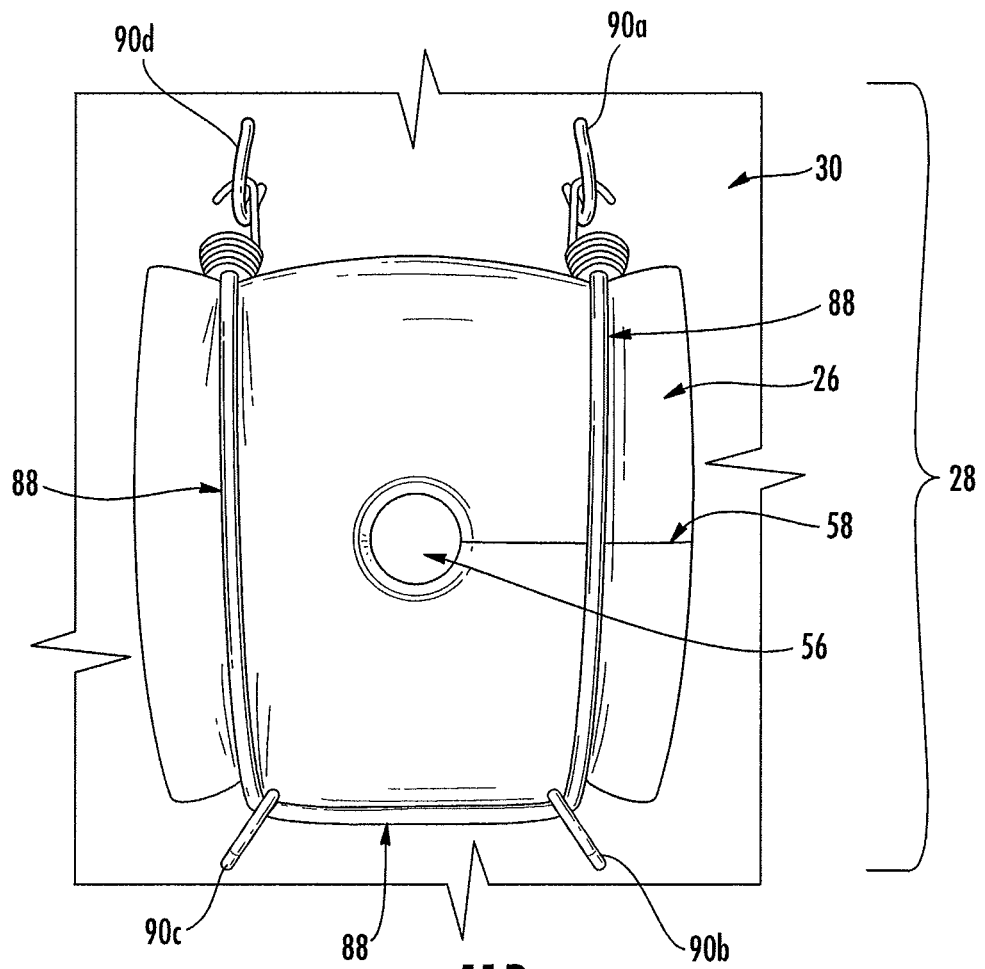

FIG. 11D illustrates an alternative embodiment of securing mechanism 28 comprising one securing tie 88 attached at one end to a first hook $90_a$, extending generally in a first direction and attached to a second hook $90_b$, extending generally in second direction that is about perpendicular to the first direction and attached to a third hook $90_c$, and extending generally in a third direction that is about parallel to the first direction and attached to a fourth hook 90$_d$. This pattern of securing tie 88 spaced apart in a generally parallel manner over flexible sealing structure 26 applies pressure to flexible sealing structure 26 at locations surrounding opening 56. Securing tie 88 is configured to secure flexible sealing structure 26 to top panel 30 such that a seal is formed between flexible sealing structure 26 and the plant stalk, stem or trunk. Securing tie 88 can be constructed of any suitable material including metal, plastic, composite material or the like, as well as any suitable fibrous material including flexible and/or elastic fibrous material. For instance, securing tie 88 can be a bungee cord, rope, string, metal cord or the like.

Figure 11E:
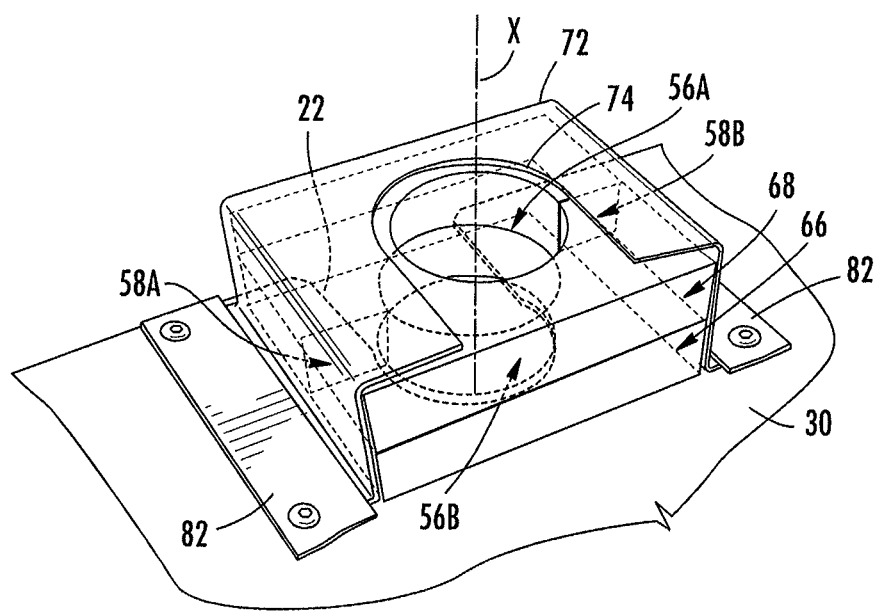

FIG. 11E illustrates an example of a possible alignment and placement of first 66 and second 68 sealing panels (see FIG. 10) and securing panel 72 (see FIG. 11A) around a plant. Securing panel 72 can be configured for holding first 66 and second 68 securing panels such that plant slot 22 of top panel 30, opening 56A of first sealing panel 66, opening 56B of second sealing panel 68, and plant receiving slot 74 of securing panel 72 are coaxially aligned about an axis X. As shown in FIG. 11E, plant receiving slot 74 of securing panel 72 opens in a different direction from plant slot 22 of top panel 30. Slit 58A of first sealing panel 66 can also extend in a different direction from slit 58B of second sealing panel 68. Further, as shown in FIG. 11E, both slit 58A of first sealing panel 66 and slit 58B of second sealing panel 68 can extend in different direction from both plant receiving slot 74 of securing panel 72 and plant slot 22 of top panel 30.

The embodiments of the insect capturing apparatus described above can be used to collect, monitor, and research insects that emerge from the ground over their life cycle. For example, corn rootworm can be observed and monitored by using the insect capturing apparatus to collect corn rootworm beetles that emerge around corn plants. In particular, the insect capturing apparatus can be useful in researching transgenic corn plants.

In one embodiment of the presently disclosed subject matter, a method is provided for assembling an insect capturing apparatus 10 for capturing insects around a plant PS. An apparatus 10 is provided as illustrated in FIGS. 1A, 1B, 3 and 4 comprising a frame 12 having an open bottom 18 and a removable top panel 30. Removable top panel 30 is provided having a plant slot 22 configured to receive a portion of a plant PS and a capture chamber opening 34 configured to receive a capture chamber 40. Apparatus 10 further includes a flexible sealing structure 26 having an opening 56 for receiving a portion of plant PS and a slit 58 (see also FIGS. 9A and 9B) extending from a periphery of flexible sealing structure 26 to opening 56 of flexible sealing structure 26. Flexible sealing structure 26 is of sufficient size to seal plant slot 22 on top panel 30. Apparatus 10 further comprising a securing mechanism 28 configured to secure flexible sealing structure 26 to top panel 30 such that opening 56 of flexible sealing structure 26 aligns with plant slot 22 of top panel 30 and flexible sealing structure 26 creates a seal about the portion of plant PS at plant slot 22 on top panel 30 to prevent the egress of insects AI.

In some embodiments the method for assembling an apparatus for capturing insects around a plant PS can further include placing frame 12 around plant PS and sliding top panel 30 onto frame 12 such that the portion of plant PS is aligned within plant slot 22 on top panel 30. The method can further include positioning flexible sealing structure 26 around plant PS in plant slot 22, and positioning securing mechanism 28 such that securing mechanism 28 secures flexible sealing structure 26 to top panel 30. The method also includes engaging a capture chamber 40 to top panel 30 at capture chamber opening 34 such that egress of insects AI is blocked at a junction of top panel 30 and capture chamber 40.

In some embodiments of the method for assembling an apparatus 10 for capturing insects around a plant, the portion of plant PS for alignment within plant slot 22 on top panel 30 is a plant stalk, stem or trunk PS. In some embodiments, frame 12 is placed such that side walls 14 touch the ground at an equal distance on either side of the plant stalk, stem or trunk PS. In some embodiments, plants PS are corn plants. In some embodiments, plants PS are transgenic corn plants. In some embodiments, the insects to be captured complete development from egg to adulthood in the ground. In some embodiments, insects AI to be captured are plant pests that feed on plant PS roots and/or a lower portion of plant PS. In some embodiments, insects AI to be captured are corn rootworm beetles.

A method is also provided for capturing, monitoring and/or studying plant insects. In some embodiments the method includes providing an apparatus 10. Referring again to the Figures, apparatus 10 includes a frame 12 having an open bottom 18 and a removable top panel 30. Top panel 30 having a plant slot 22 configured to receive a portion of a plant PS and a capture chamber opening 34 configured to receive a capture chamber 40. Apparatus 10 further includes a flexible sealing structure 26 having an opening 56 for receiving a portion of plant PS and a slit 58 extending from a periphery of flexible sealing structure 26 to opening 56 of flexible sealing structure 26. Flexible sealing structure 26 is of sufficient size to seal plant slot 22 on top panel 30. Apparatus 10 further comprises a securing mechanism 28 configured to secure flexible sealing structure 26 to top panel 30 such that opening 56 of flexible sealing structure 26 aligns with plant slot 22 of top panel 30 and flexible sealing structure 26 creates a seal about the portion of plant PS at plant slot 22 on top panel 30 to prevent the egress of insects AI.

In some embodiments the method also includes placing apparatus 10 around a plant PS and engaging a capture chamber 40 with top panel 30 at capture chamber openings 34 such that egress of insects AI is blocked at the junction of top panel 30 and capture chamber 40. In some embodiments the method further comprising obtaining insects AI that are captured in capture chamber 40, such that captured insects AI can be monitored and/or studied.

In some embodiments of the method for monitoring and/or studying plant insects AI, the portion of plant PS for alignment within plant slot 22 on top panel 30 is a plant stalk, stem or trunk PS. In some embodiments, frame 12 is placed such that side walls 14 touch the ground at an equal distance on either side of the plant stalk, stem or trunk PS. In some embodiments, the plants PS are corn plants. In some embodiments, the plants PS are transgenic corn plants. In some embodiments, insects AI to be captured complete development from egg to adulthood in the ground. In some embodiments, insects AI to be captured are plant pests that feed on plant PS roots and/or a lower portion of the plant PS. In some embodiments, insects AI to be captured are corn rootworm beetles.

Accordingly, the advantages of the presently disclosed insect capturing apparatus, illustrated generally as 10, include but are not limited to an improved ability to accurately measure the insect load in the field. This is due in part to the increased number of plants PS that can be encompassed by the presently disclosed insect capturing apparatus 10 over a single plant apparatus. In addition, the presently disclosed apparatus 10 allows for efficient retrieval of the trapped insects AI, through use of an easily removable and replaceable capture chamber 40. Further, the shape and weight of apparatus 10 minimizes the risk of wind and storm damage to apparatus 10.

Another advantage of the present apparatus 10 is the increased range of time that it can be placed on a growing plant PS in the field without damaging the plant PS. For example, frame 12 of apparatus 10 can be placed around a plant PS or group of plants PS early in the growth cycle and top panel 30, sealing structure 26 and securing mechanism 28 of apparatus 10 engaged with the plant PS at a later stage in the plant growth cycle. This is possible because the design of apparatus 10 does not require the plant PS leaves to be threaded through a hole in the top of apparatus 10. Similarly, the design of apparatus 10 also allows for further growth of the plant PS in both height and girth.

It will be understood that various details of the invention can be changed without departing from the scope of the invention. Furthermore, the foregoing description is for the purpose of illustration only, and not for the purpose of limitation, as the invention is defined by the claims as set forth hereinafter.

What is claimed is:

1. An apparatus for capturing insects, the apparatus comprising:
   a frame having an open bottom, side walls, and a removable top panel, the top panel having a plant slot configured to receive a portion of a plant and a capture chamber opening configured to provide passage into a capture chamber, wherein at least one of the side walls has a window panel therein, the window panel comprising an air permeable and liquid permeable material, and wherein the plant slot opens at one side of the top panel;
   a flexible sealing structure having an opening defining a hole for receiving a portion of the plant, the flexible sealing structure being configured to contact and seal the plant slot on the top panel; and
   a securing mechanism configured to secure the flexible sealing structure to the top panel such that the opening of the flexible sealing structure aligns with the plant slot of the top panel and the flexible sealing structure creates a seal about the portion of the plant at the plant slot on the top panel to prevent egress of an insect.

2. The apparatus of claim 1, wherein the air permeable and liquid permeable material comprises at least one of a mesh or a screen.

3. The apparatus of claim 1, wherein at least two of the side walls of the frame are at least partially sloped toward the top panel from the bottom of the frame.

4. The apparatus of claim 3, wherein the plant slot is configured to receive a portion of a plant so that the bottom of the frame along the at least two sloped side walls is an equidistance from the plant placed therein.

5. The apparatus of claim 3, wherein the at least two sloped side walls slope at different angles.

6. The apparatus of claim 1, wherein the plant slot is configured to receive a stalk, stem or trunk.

7. The apparatus of claim 6, wherein the plant slot terminates in a circular shape of sufficient size to surround a plant stalk, stem or trunk and configured to permit the plant stalk, stem or trunk to be inserted into the plant slot such that a lower portion of the plant stalk, stem or trunk is contained inside of the frame.

8. The apparatus of claim 7, wherein the circular shape of the plant slot has a cross-sectional diameter larger than a width of a rest of the plant slot.

9. The apparatus of claim 1, wherein the capture chamber opening of the top panel further comprises a plurality of capture chamber openings and the plant slot of the top panel further comprises a plurality of plant slots.

10. The apparatus of claim 9, wherein the plurality of capture chamber openings is three and the plurality of plant slots is eight.

11. The apparatus of claim 1, wherein the flexible sealing structure having an opening further comprises a first flexible sealing panel and a second flexible sealing panel, each of the first and second sealing panels having an opening for receiving a portion of the plant and a slit extending from a periphery of the respective flexible sealing panel to the opening of the respective flexible sealing panel, the first and second flexible sealing panels configured to be securely positioned between the securing mechanism and the top panel.

12. The apparatus of claim 11, wherein the openings of the first and second flexible sealing panels are aligned with the plant slot of the top panel and the slits of the first and second flexible sealing panels extend in different directions upon alignment.

13. The apparatus of claim 11, wherein the slits of the first and second flexible sealing panels do not overlap the plant slot of the top panel.

14. The apparatus of claim 1, wherein the flexible sealing structure includes a slit extending from a periphery of the flexible sealing structure to the opening of the flexible sealing structure.

15. The apparatus of claim 14, wherein the slit of the flexible sealing structure comprises at least one of a step cut or a tongue and groove cut.

16. The apparatus of claim 14, further comprising the capture chamber configured to capture insects therein and to engage the capture chamber opening.

17. The apparatus of claim 16, wherein the capture chamber comprises a funnel affixed inside a container having an open end, the funnel having a narrow end and a wide end with the wide end positioned proximal the open end of the container and the narrow end extending inside the container.

18. The apparatus of claim 16, wherein the funnel directs the insect egress into the container.

19. The apparatus of claim 16, wherein the capture chamber is removable and replaceable.

20. The apparatus of claim 16, wherein the top panel further comprises a lip affixed to the top panel and circumscribing the capture chamber opening with the capture chamber being engageable with the top panel by placement of the capture chamber with an open end of the container facing downward within the lip.

21. The apparatus of claim 16, wherein the capture chamber includes an attractant.

22. The apparatus of claim 1, wherein the securing mechanism comprises at least one of clamps or ties for securing the flexible sealing structure to the top panel.

23. The apparatus of claim 1, wherein the securing mechanism comprises a securing panel configured for attachment to the top panel and having a plant receiving slot open to one side thereof, the securing panel configured for holding the flexible sealing structure such that the plant slot of the top panel, the opening of the flexible sealing structure, and the plant receiving slot of the securing panel are coaxially aligned.

24. The apparatus of claim 22, wherein the plant receiving slot of the securing panel opens in a different direction from the plant slot of the top panel.

25. The apparatus of claim 24, wherein the securing panel comprises two walls and two feet, the feet being configured for insertion in a groove on either side of the plant slot on the top panel such that the securing panel is affixed to the top panel and secures the flexible sealing structure to the top panel.

\* \* \* \* \*